(12) United States Patent
Jacobsen

(10) Patent No.: US 7,245,880 B1
(45) Date of Patent: Jul. 17, 2007

(54) TRANSMIT POWER CONTROL WITHIN A WIRELESS TRANSMITTER

(75) Inventor: Eric A. Jacobsen, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 09/652,773

(22) Filed: Aug. 31, 2000

(51) Int. Cl.
   *H04B 1/00* (2006.01)
   *H04B 7/00* (2006.01)

(52) U.S. Cl. .................. 455/69; 455/13.4; 455/522; 455/562; 455/452.2; 370/318

(58) Field of Classification Search .............. 455/69, 455/13.4, 522, 562, 452.2; 370/318
   See application file for complete search history.

(56) References Cited

U.S. PATENT DOCUMENTS

| | | | | |
|---|---|---|---|---|
| 5,208,756 A | * | 5/1993 | Song .................. | 455/456.3 |
| 5,257,031 A | * | 10/1993 | Scarpetta et al. ........ | 342/374 |
| 5,650,785 A | | 7/1997 | Rodal .................. | 342/357 |
| 5,663,990 A | * | 9/1997 | Bolgiano et al. ........ | 375/138 |
| 5,719,583 A | | 2/1998 | Kanai .................. | 342/378 |
| 5,768,684 A | * | 6/1998 | Grubb et al. ........... | 455/13.4 |
| 5,943,020 A | * | 8/1999 | Liebendoerfer et al. ... | 343/702 |
| 6,009,124 A | * | 12/1999 | Smith et al. ........... | 375/267 |
| 6,075,484 A | * | 6/2000 | Daniel et al. .......... | 342/372 |
| 6,078,824 A | | 6/2000 | Sogo .................. | 455/562 |
| 6,088,570 A | | 7/2000 | Komara et al. .......... | 455/11.1 |
| 6,104,343 A | * | 8/2000 | Brookner et al. ........ | 342/372 |
| 6,127,740 A | * | 10/2000 | Roddy et al. ........... | 307/10.1 |
| 6,148,219 A | * | 11/2000 | Engelbrecht et al. ..... | 455/562 |
| 6,239,747 B1 | * | 5/2001 | Kaminski .............. | 342/442 |
| 6,240,098 B1 | * | 5/2001 | Thibault et al. ........ | 370/431 |

(Continued)

FOREIGN PATENT DOCUMENTS

EP        1014599        6/2000

(Continued)

OTHER PUBLICATIONS

Cleveland, Jr., R. , et al., "Evaluating Compliance with FCC Guidelines for Human Exposure to Radiofrequency Electromagnetic Fields: Additional Information for Radio & Television Broadcast Stations", *OET Bulletin 65, Edition 97-01*, Federal Communications Commission, Office of Engineering and Technology, (Aug. 1997), 1-43.

(Continued)

*Primary Examiner*—Steve M. D'Agosta
(74) *Attorney, Agent, or Firm*—Schwegman, Lundberg, Woessner & Kluth, P.A.

(57) ABSTRACT

A wireless transmitter system for use in maintaining a wireless link with a remote transceiver includes a beamforming transmit antenna structure and a power control unit for controlling transmit power levels. The system determines the direction of the remote transceiver and then generates a transmit antenna beam in that direction. The power control unit then determines the antenna gain of the generated beam and uses the antenna gain information to adjust the transmit power level of the system so that it does not exceed government mandated limits. In one embodiment, the average transmit duty cycle of the system is also used to adjust transmit power. The system is capable of achieving a maximum transmit power without exceeding applicable power limits.

30 Claims, 2 Drawing Sheets

U.S. PATENT DOCUMENTS

| | | | |
|---|---|---|---|
| 6,345,188 B1* | 2/2002 | Keskitalo et al. | 455/561 |
| 6,381,462 B1* | 4/2002 | Charas | 455/452.2 |
| 6,421,007 B1* | 7/2002 | Owen et al. | 342/417 |
| 6,463,295 B1* | 10/2002 | Yun | 455/522 |

FOREIGN PATENT DOCUMENTS

| | | |
|---|---|---|
| WO | WO-99/40689 | 8/1999 |
| WO | WO-9957574 A1 | 11/1999 |
| WO | WO-0219562 A2 | 3/2002 |

OTHER PUBLICATIONS

Ulcek, J., et al., "Evaluating Compliance with FCC Guidelines for Human Exposure to Radiofrequency Electromagnetic Fields: Additional Information for Amateur Radio Stations", *OET Bulletin 65, Supplement B, Edition 97-01*, Federal Communications Commission, Office of Engineering and Technology, (Nov. 1997), 1-65.

"ETSI EN 300 328-1 V i.2.2 (Jul. 2000)", *European Telecommunications Standards Institute*, <http://webapp.etsi.org/exchangerfolder.en_30032801v010202p.pdf>,(Jul. 2000).

"Examination Report for corresponding United Kingdom Patent Application No. 0303836.1", (Oct. 17, 2003), 2 pgs.

"First Office Action for corresponding Chinese Patent Application No. 01803384.9", (Oct. 15, 2004), 1 pg.

"International Preliminary Examination Report for corresponding PCT Applicaiton No. PCT/US01/26884", (Dec. 4, 2003), 8 pgs.

"International Search Report for corresponding PCT Application No. PCT/US01/26884", (Aug. 31, 2000), 3 pgs.

"Office Action for corresponding German Patent Application No. 101 96 568.0-35", (Feb. 27, 2003), 12 pgs.

"Summary of the Reasons for Rejection for corresponding Taiwanese Patent Application No. 90121086", (Dec. 10, 2002), 1 pg.

"Written Opinion for corresponding PCT Application No. PCT/US01/26884", (Jul. 2, 2003), 7 pgs.

\* cited by examiner

TRANSMIT POWER CONTROL WITHIN A WIRELESS TRANSMITTER

FIELD OF THE INVENTION

The invention relates generally to wireless communication systems and, more particularly, to power control techniques for use therein.

BACKGROUND OF THE INVENTION

Wide area networks (WANs) that can be accessed wirelessly from homes and small offices are becoming increasingly popular. Such systems can offer a myriad of data services to subscribers including, for example, a relatively high speed connection to the Internet. Typically, a professional installation of transceiver and antenna equipment is required at the subscriber location to provide subscriber access to a WAN. During the installation process, a technician must first determine an appropriate mounting location for an antenna unit on the exterior of the subscriber's building and then perform a relatively complex antenna aiming procedure to ensure that the antenna is properly directed toward the WAN base station antenna. Transceiver equipment is then installed and cabling is run from the external antenna location to the location of the subscriber's communication equipment inside the building. This rather complicated setup procedure adds to the overall cost and complexity of providing WAN services and is relatively inefficient.

Therefore, there is a need for a method and apparatus that allows simplified installation and setup of a wireless subscriber terminal for use with a WAN or similar communication network. Preferably, the method and apparatus will allow a subscriber to perform the terminal setup without the need for a professional installer.

DETAILED DESCRIPTION

Figure 1:
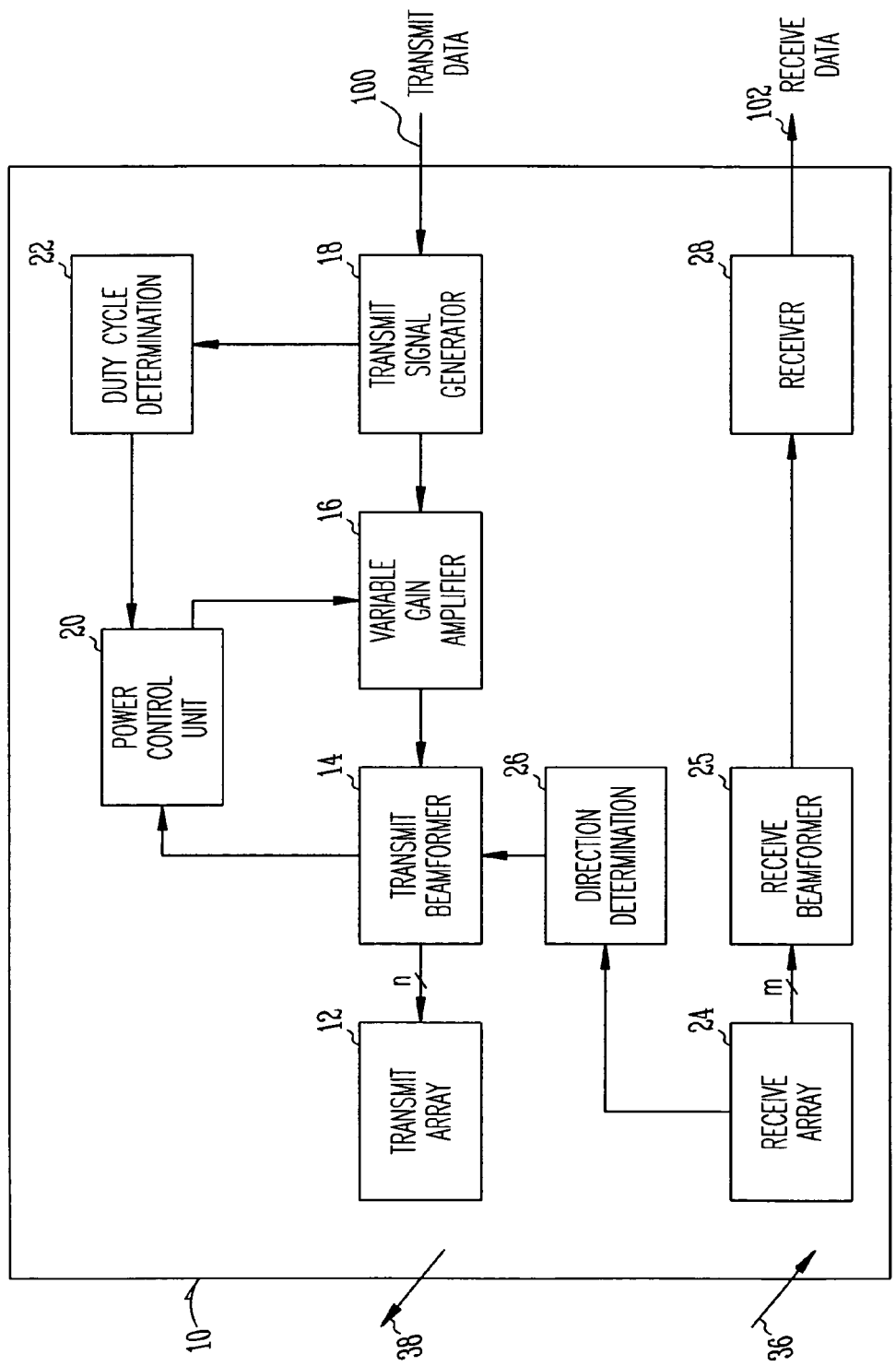
FIG. 1 is a block diagram illustrating a communication system in accordance with one embodiment of the present invention.

The present invention relates to a wireless transmitter/antenna system that can be used by subscribers to achieve wireless access to a remote communication system or network. The system is relatively simple to install and can typically be setup by the subscriber alone without the assistance of a professional installer. In addition, because the system is easy to install and setup, it can be used in association with a portable data processing device to provide wireless access to a remote system for a mobile user. The system can be used to support a wireless connection with any of a wide variety of different network types including: wide area networks (WANs), wireless local area networks (LANs), municipal area networks (MANs), public access networks (PANs), public switched telephone networks using wireless local loop, and others. The system uses a beamforming or adaptive antenna arrangement that is capable of automatically generating a transmit beam in the direction of an external communication system base station or the like. The system is also capable of performing power control procedures to insure that transmit power in the system is adequate to penetrate, for example, the exterior walls of the subscriber's building and reach the external base station without exceeding any government mandated power limits. In one approach, the system calculates the antenna gain of the main lobe of the generated antenna pattern using, among other things, the transmit beamformer parameters. This antenna gain information is then used to adjust the transmit power of the antenna so that the government mandated limit(s) are not exceeded. Other parameters, such as average transmit duty cycle, can also be factored into the transmit power adjustment.

In one embodiment of the invention, an indoor transmitter/antenna system is provided that can be made part of a complete desktop system using an integrated indoor antenna. The use of an indoor system simplifies the terminal installation process as complicated outdoor antenna placement and cabling tasks are avoided. An indoor system, however, has to be able to generate enough transmit power to penetrate the exterior walls of the subscriber's building to enable communication with a remote base station transceiver. In addition, an indoor system must comply with the FCC's standards for human exposure to electromagnetic radiation and the FCC imposed power limitations on individual spectrum bands. Other government imposed power limitations may also apply. To comply with these various requirements, the system of the present invention utilizes power management techniques that are designed to optimize transmit power without exceeding existing power limits.

The FCC human exposure guidelines set a limit on the average transmit power that can be generated by a system over a predetermined time period (e.g., currently six minutes). Thus, a system that transmits for only a portion of each time interval can utilize an instantaneous transmit power level that is greater than a system that transmits continuously. The increased power level will be inversely proportional to the duty cycle of the transmitter over that period. For example, a transmitter with an average duty cycle of 20% over a six minute period can generate a peak output power that is 5 times that of a system transmitting a continuous signal over that same period according to the standard.

FIG. 1 is a block diagram illustrating an indoor communication system 10 in accordance with one embodiment of the present invention. The system 10 will typically be located within a subscriber's home or office for use in providing a wireless link to a remote transceiver, such as a WAN base station or the like. The system 10 includes an input 100 for receiving data to be transmitted to the remote transceiver (i.e., transmit data) from a data processing unit (e.g., a personal computer) at the subscriber location. The system 10 also includes an output 102 for outputting data received from the remote transceiver (i.e., receive data) to the local data processing unit. The communication system 10 will preferably be housed within one or two individual housings that can be easily coupled to a personal computer or the like using standard interface techniques. For example, parallel or serial cables, Universal Serial Bus (USB) structures, coaxial cable, infrared coupling, PCMCIA cables, or other coupling techniques can be used. Alternatively, all or part of the communication system 10 can be located on an expansion card that can be inserted into an available slot of the data processing unit. The interface can also include plug-and-play capability. In a typical setup procedure, the subscriber would couple the system 10 to the data processing unit using the appropriate coupling technique, install any necessary software to the data processing unit, power up the system 10, and run a setup program in the data processing unit.

As illustrated in FIG. 1, the communication system 10 includes: a transmit array 12, a transmit beamformer unit 14, a variable gain amplifier 16, a transmit signal generator 18, a power control unit 20, a duty cycle determination unit 22, a receive array 24, a receive beamformer 25, a direction determination unit 26, and a receiver 28. The receive array 24 is operative for receiving a radio frequency (RF) signal 36 from a remote transceiver (not shown) with which the system 10 is communicating. The receive array 24 includes a plurality of antenna elements that are arranged in a fixed configuration and that each receive a portion of the incoming signal 36. Each of the received signal portions are delivered to the receive beamformer 25 which combines the signal portions into a single RF receive signal for delivery to the receiver 28. The receiver 28 processes the RF receive signal to generate the receive data that is delivered to the local data processing unit via output 102. The receiver 28 can include, among other things, downconverter functionality, decoder functionality, and error detection/correction functionality.

The direction determination unit 26 analyzes the signals received by the elements of the receive array 24 to determine the direction from which the RF signal 36 was received. Techniques for determining the direction of an incoming RF signal are well known in the art. The direction determination unit 26 transfers the direction information to the transmit beamformer 14 which uses the direction information, along with knowledge of the array configuration of the transmit array 12, to generate a transmit beam in the direction of the remote transceiver. The newly generated transmit beam can then be used by the communication system 10 to transmit an RF transmit signal 38 to the remote transceiver.

The transmit signal generator 18 receives the transmit data from the local data processing unit and uses the data to generate an RF transmit signal for delivery to the remote transceiver. The transmit signal generator 18 will typically include a modulator for modulating an RF carrier signal using the input data. The transmit signal generator 18 can also include, among other things, a data encoder and/or error correction encoder for encoding the input data before modulating the carrier. The variable gain amplifier 16 receives the RF transmit signal from the transmit signal generator 18 and amplifies the signal by a predetermined amount. The amplified transmit signal is then delivered to the transmit beamformer 14 which splits the signal into a number of components for delivery to the individual elements of the transmit array 12. The amplitudes and phases of the individual signal components delivered to the elements of the transmit array 12 by the transmit beamformer 14 determine the shape and direction of the resulting transmit beam.

The transmit array 12 can include virtually any number of antenna elements in accordance with the present invention. In addition, virtually any type of antenna element can be used, although low-profile, lightweight, less-expensive element types are preferred (e.g., microstrip patches or dipoles, etc.). Furthermore, virtually any array configuration can be used. The transmit beamformer 14 will typically include a separate variable delay unit and variable gain unit for each element of the transmit array 12. The transmit beamformer 14 will also preferably include a processing device that is programmed to determine appropriate settings for the variable gain and delay units to generate a relatively narrow transmit beam in the direction of the remote transceiver (using, e.g., well known phased array techniques).

By generating a relatively narrow beam in the direction of the remote transceiver, the available transmit power within the communication system 10 is concentrated in the direction of the remote transceiver. Thus, a higher power level is achievable for penetrating the exterior walls of the building than could be attained using an omni-directional transmit beam (or other wide beamwidth beam). In addition, because less power is wasted, a smaller power amplifier can be used in the communication system 10 which reduces equipment cost. As described above, however, the increased power level achieved by concentrating the available energy into a narrowed transmit beam must not exceed government imposed transmit power limits. As described in greater detail below, the power control unit 20 is operative for adjusting the power level currently being transmitted by the system 10 to insure that the applicable power limits are not exceeded.

The power control unit 20 receives the beam parameters of the presently configured transmit beam from the transmit beamformer 14 and uses the parameters to calculate the antenna gain of the main lobe of the transmit pattern. Based on the calculated antenna gain, the power control unit 20 adjusts the gain of the variable gain amplifier 16 so that applicable power limits are not exceeded. The duty cycle determination unit 22 monitors the transmit activity of the transmit signal generator 18 to maintain a continuous average of transmit duty cycle over a six minute time interval. The average duty cycle information is then transferred to the power control unit 20 which uses the information in adjusting system transmit power. Thus, if a relatively low transmit duty cycle is being used, a higher peak power can be transmitted before exceeding the FCC human exposure limits. The power control unit 20 can also implement other more traditional power control procedures that reduce the transmit power from the maximum allowable value when favorable link conditions exist.

In one embodiment of the invention, a single array of antenna elements is used to perform the functions of both the transmit and receive arrays 12, 24. A duplexer (not shown) can be provided for separating transmit and receive signals within the system 10. Alternatively, an adaptive antenna arrangement can be utilized to automatically adapt to the location of the remote transceiver. An adaptive arrangement can be used, for example, in systems involving mobile users.

It should be appreciated that the individual blocks illustrated in FIG. 1 are functional in nature and do not necessarily correspond to discrete hardware elements. For example, in one approach, two or more of the functional blocks are implemented in software within a single digital processing device. In addition, the locations of the individual functional blocks can be changed without departing from the spirit and scope of the invention. For example, the variable gain amplifier 16 can be located between the transmit beamformer 14 and the transmit array 12. Alternatively, multiple amplification stages can be implemented at various positions within the system 10. For example, the variable gain amplifier 16 can be replaced by a low power variable gain amplifier that is controlled by the power control unit 20 followed by a linear power amplifier. In one approach, the power control unit 20 is capable of controlling the variable gain units within the transmit beamformer 14 for use in adjusting transmit power.

In the illustrated embodiment, the direction determination unit 26 determines the direction of the remote transceiver by analyzing the signal components received by the individual elements of the receive array 24. It should be appreciated that the invention can utilize virtually any form of direction determination technique and is not limited to the above-described approach. In one embodiment, for example, global positioning system (GPS) equipment is used to determine the present position of the communications system 10 so that the distance and direction of the nearest WAN base station (or other remote transceiver) can be ascertained. As will be apparent to a person of ordinary skill in the art, other techniques for determining the direction of the remote transceiver also exist.

In one embodiment of the invention, the communication system 10 is implemented for use with a mobile or portable platform. Thus, a subscriber is able to move from place to place and still maintain a connection to, for example, a communication service provider. For example, a salesman can carry a laptop computer that includes or is coupled to a system 10 incorporating the principles of the present invention. When visiting a customer plant, for example, the salesman is able to perform an acquisition procedure, like the one described above, to connect the laptop computer to the nearest WAN base station for communicating with the salesman's home office. The communication system will generate a directed beam toward the base station and adjust the transmit power to comply with applicable limits. Similarly, the principles of the present invention can be implemented for use in mobile applications. In such an arrangement, an adaptive antenna beam will be used that remains directed at the applicable base station regardless of the movements of the associated user. In this approach, the gain of the main antenna beam will be continuously tracked and the power levels continuously adjusted in accordance therewith.

Figure 2:
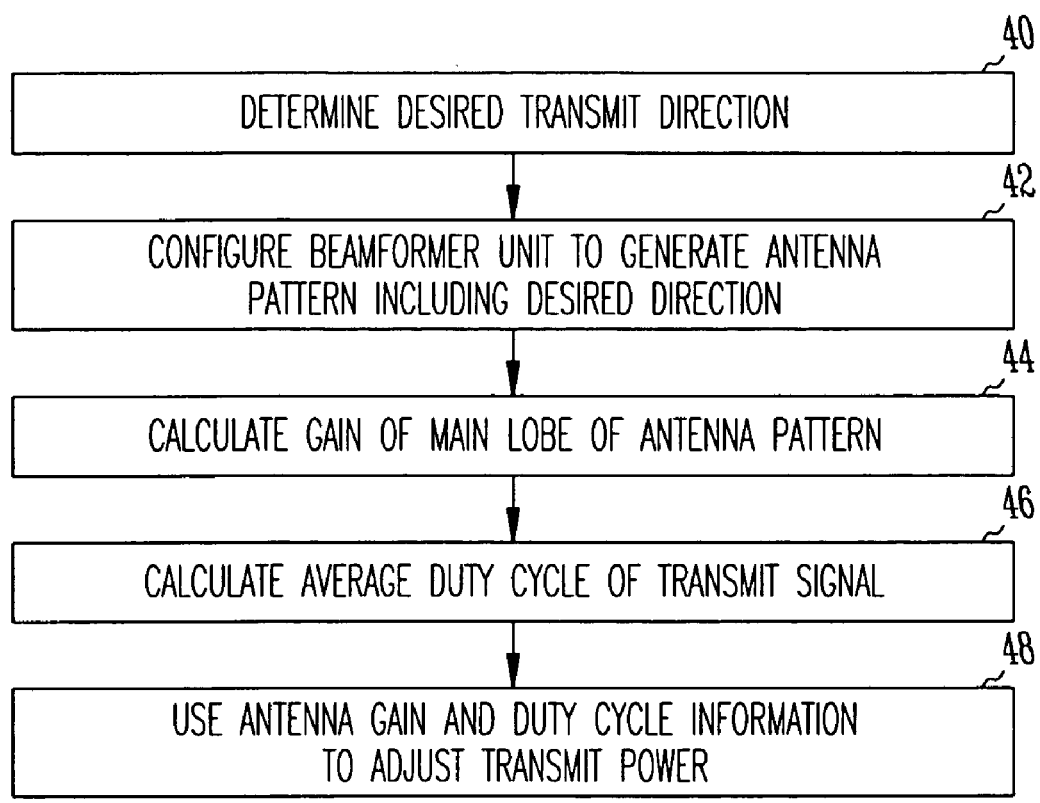
FIG. 2 is a flowchart illustrating a method for use in maintaining a wireless link with a remote transceiver in accordance with one embodiment of the present invention.

FIG. 2 is a flowchart illustrating a method for use in maintaining a wireless link with a remote communication entity using a beamformer antenna in accordance with one embodiment of the present invention. First, a desired transmit direction is determined (block 40). Next, a beamformer unit is configured to generate a transmit antenna pattern that includes the desired transmit direction (block 42). The gain of the main lobe of the generated antenna pattern is then calculated based on the beamformer parameters (block 44). The average duty cycle of the transmit signal over a predetermined time interval is determined (block 46). The antenna gain and average duty cycle information is then used to adjust the power transmitted by the antenna so that it does not exceed applicable limitations (block 48).

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A system for use in wirelessly transmitting a communication signal to a remote transceiver, said system comprising:
   an array of transmit antenna elements arranged in a predetermined pattern;
   a direction determination unit to determine a direction of the remote transceiver;
   a transmit beamformer coupled to said array of antenna elements to generate a transmit beam in the direction of the remote transceiver;
   a power control unit to determine an antenna gain related parameter associated with said transmit beam generated by said transmit beamformer and to adjust a transmit power level of said system based on said antenna gain related parameter; and
   a duty cycle unit, coupled to said power control unit, to determine an average transmit duty cycle of said system over a predetermined time period and to deliver said average transmit duty cycle information to said power control unit, wherein said power control unit uses said average transmit duty cycle information to adjust the transmit power level of said system.

2. The system claimed in claim 1, wherein:
said power control unit adjusts said transmit power level of said system to comply with mandated transmit power limits.

3. The system claimed in claim 1, wherein:
said array of transmit antenna elements, said direction determination unit, and said transmit beamformer are each part of an adaptive antenna arrangement.

4. The system claimed in claim 1, further comprising:
an array of receive antenna elements that are arranged in a predetermined pattern for use in receiving a communication signal from the remote transceiver, wherein said direction determination unit includes means for analyzing signal portions received by individual antenna elements within said array of receive elements to determine the direction of the remote transceiver.

5. The system claimed in claim 1, wherein:
said transmit beam generated by said transmit beamformer is approximately centered in the direction of the remote transceiver determined by said direction determination unit.

6. The system claimed in claim 1, further comprising:
an input/output interface to couple said system to a data processing device.

7. The system claimed in claim 6, wherein:
said input/output interface includes a serial data port.

8. The system claimed in claim 6, wherein:
said input/output interface includes a universal serial bus (USB) port.

9. The system claimed in claim 6, wherein:
said input/output interface includes plug-and-play capability.

10. The system claimed in claim 1, wherein:
said array of transmit antenna elements, said direction determination unit, said transmit beamformer, and said power control unit are each mounted on a common support structure.

11. The system claimed in claim 10, wherein:
said common support structure is adapted for desktop placement.

12. The system claimed in claim 1, comprising:
at least one variable gain amplifier to amplify a transmit signal before it is delivered to said array of transmit antenna elements during a transmit operation, wherein said power control unit controls the gain of said at least one variable gain amplifier to adjust the transmit power level of said system.

13. A system for use in wirelessly transmitting a communication signal to a remote transceiver, said system comprising:
   an array of transmit antenna elements arranged in a predetermined pattern;
   a direction determination unit to determine a direction of the remote transceiver;
   a transmit beamformer coupled to said array of antenna elements to generate a transmit beam in the direction of the remote transceiver;
   a power control unit to determine an antenna gain related parameter associated with said transmit beam generated by said transmit beamformer and to adjust a transmit power level of said system based on said antenna gain related parameter, and wherein said transmit beamformer includes a variable delay unit for each of said antenna elements within said array of transmit antenna elements and a controller to determine a delay setting for each variable delay unit based upon the direction of the remote transceiver determined by said direction determination unit.

14. The system claimed in claim 13, wherein:

said power control unit includes a controller to calculate said antenna gain related parameter based upon delay settings of said transmit beamformer.

15. A method for use in wirelessly transmitting a communication signal to a remote location, said method comprising:

determining a direction of said remote location;

generating a transmit antenna beam in the direction of said remote location using phased array principles from an array of transmit antenna elements;

determining a parameter related to an antenna gain associated with said transmit antenna beam;

using said antenna gain related parameter to adjust a power level of a transmit signal to be transmitted to said remote location via said transmit antenna beam;

determining a delay setting for a variable delay unit for each of said antenna elements within said array based upon the direction of said remote location;

determining an average transmit duty cycle associated with transmissions to said remote location; and using said average transmit duty cycle to adjust the power level of said transmit signal.

16. The method claimed in claim 15, wherein:

determining a direction of said remote location includes receiving an RF signal from said remote location and analyzing said RF signal to determine the direction of said remote location.

17. The method claimed in claim 15, wherein:

determining a direction, generating a transmit antenna beam, determining a parameter related to an antenna gain, and using said antenna gain related parameter are performed from a single indoor location.

18. The method claimed in claim 15, wherein:

using said antenna gain related parameter includes adjusting the power level of said transmit signal in a manner that complies with mandated transmit power limits.

19. The method claimed in claim 18, wherein:

using said antenna gain related parameter includes adjusting the power level of said transmit signal to maximize said power level while not exceeding said mandated transmit power limits.

20. The method claimed in claim 15, further comprising calculating said antenna gain related parameter based upon said delay settings.

21. A communication system for use in communicating with a remote communication entity, comprising:

an array of antenna elements arranged in a predetermined configuration;

an adjustable beamformer coupled to said array of antenna elements to generate a transmit beam in a predetermined direction in response to a control signal, said adjustable beamformer being capable of generating a beam in any of a plurality of different directions;

a power control unit to adjust a power level of a transmit signal to be transmitted by said array of antenna elements based on at least one parameter associated with said transmit beam generated by said adjustable beamformer; and a duty cycle determination unit to determine an average transmit duty cycle of said system over a predetermined time period, wherein said power control unit adjusts the power level of the transmit signal to be transmitted by said array of antenna elements based on said average transmit duty cycle.

22. The communication system claimed in claim 21, wherein:

said at least one parameter associated with said transmit beam includes an antenna gain related parameter.

23. The communication system claimed in claim 21, wherein:

said adjustable beamformer generates the transmit beam in the predetermined direction using conventional phased array techniques.

24. The communication system claimed in claim 21, wherein:

said adjustable beamformer is part of an adaptive antenna arrangement.

25. The communication system claimed in claim 21, wherein:

said power control unit adjusts the power level of the transmit signal so that a maximum allowed power level is not exceeded.

26. A communication system for use in communicating with a remote communication entity, comprising:

an array of dipole antenna elements arranged in a predetermined configuration;

an adjustable beamformer coupled to said array of dipole antenna elements to generate a transmit beam in a predetermined direction in response to a control signal, said adjustable beamformer being capable of generating a beam in any of a plurality of different directions;

a power control unit to adjust a power level of a transmit signal to be transmitted by said array of dipole antenna elements based on at least one parameter associated with said transmit beam generated by said adjustable beamformer; and a duty cycle determination unit to determine an average transmit duty cycle of said system over a predetermined time period, wherein said power control unit adjusts the power level of the transmit signal to be transmitted by said array of dipole antenna elements based on said average transmit duty cycle.

27. The communication system claimed in claim 26, wherein:

said at least one parameter associated with said transmit beam includes an antenna gain related parameter.

28. The communication system claimed in claim 26, wherein:

said adjustable beamformer generates the transmit beam in the predetermined direction using conventional phased array techniques.

29. The communication system claimed in claim 26, wherein:

said adjustable beamformer is part of an adaptive antenna arrangement.

30. The communication system claimed in claim 26, wherein:

said power control unit adjusts the power level of the transmit signal so that a maximum allowed power level is not exceeded.

* * * * *